US006363547B1

(12) United States Patent
Perry

(10) Patent No.: US 6,363,547 B1
(45) Date of Patent: Apr. 2, 2002

(54) APPARATUS FOR SUPPORTING BATHING ENCLOSURE PANELS

(75) Inventor: Edward A. Perry, Long Beach, CA (US)

(73) Assignee: American Shower Door, Inc., Los Angeles, CA (US)

( * ) Notice: Subject to any disclaimer, the term of this patent is extended or adjusted under 35 U.S.C. 154(b) by 0 days.

(21) Appl. No.: 09/649,457

(22) Filed: Aug. 25, 2000

(51) Int. Cl.[7] .............................. A47K 3/22; A47K 3/34; A47K 3/36
(52) U.S. Cl. .............................................. 4/614; 4/612
(58) Field of Search ........................... 4/596, 607, 612, 4/614; 52/208, 770, 765, 204.5; 403/388

(56) References Cited

U.S. PATENT DOCUMENTS

| 890,799 A | | 6/1908 | Robinson et al. | |
| 1,664,543 A | | 4/1928 | Easterman | |
| 4,035,957 A | | 7/1977 | Roloff | |
| 4,866,895 A | * | 9/1989 | Hlavaty | ........................ 52/208 |
| 5,079,798 A | | 1/1992 | Burke et al. | |
| 5,297,313 A | | 3/1994 | Brin | |
| 5,642,959 A | | 7/1997 | Greferath | |

FOREIGN PATENT DOCUMENTS

EP 87822 * 9/1983 .................... 4/607

* cited by examiner

Primary Examiner—David J. Walczak
Assistant Examiner—Tuan Nguyen
(74) Attorney, Agent, or Firm—Leo F. Costello

(57) ABSTRACT

Apparatus for supporting heavy glass panels in a bathing enclosure without opaque metal frames or metal clips. The supporting apparatus includes transparent plastic support brackets and fasteners that attach to the heavy glass panels. These brackets and fasteners are used in a panel assembly to join an adjacent wall or pan to a fixed glass panel or panels and to join adjacent fixed glass panels to each. Although not relied on for support, clear sealant in the joints of the assembly enhances the overall integrity of the support. The combination provides dependable support while giving the enclosure a more transparent look. The brackets and fasteners are preferably molded of clear polycarbonate, which has the characteristics of transparency, strength, and moisture resistance needed, and the sealant is preferably silicone.

11 Claims, 17 Drawing Sheets

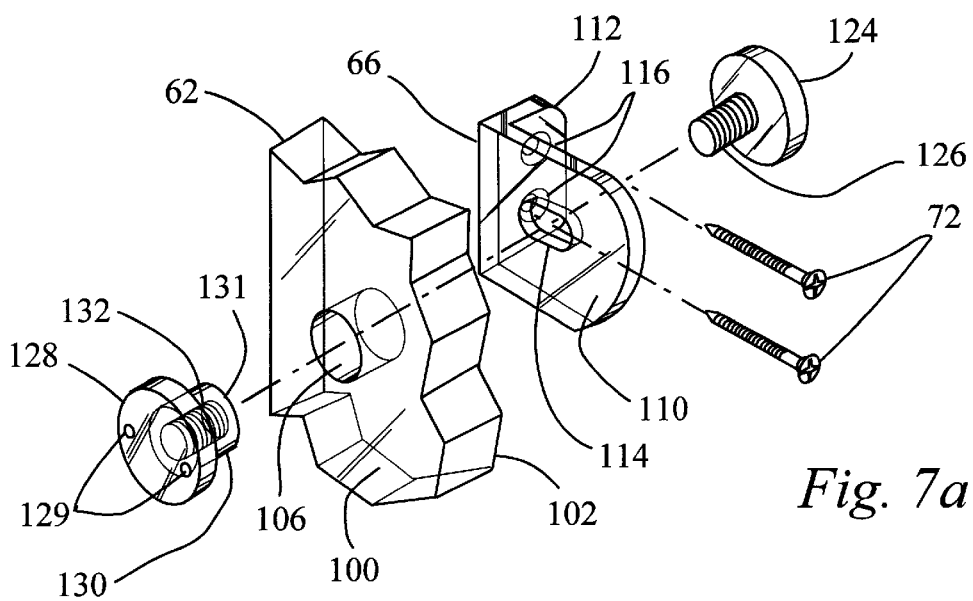
*Fig. 7a*
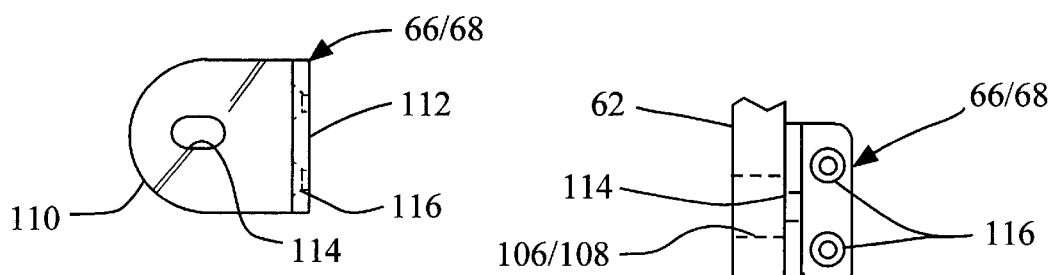
*Fig. 7b*
*Fig. 7c*
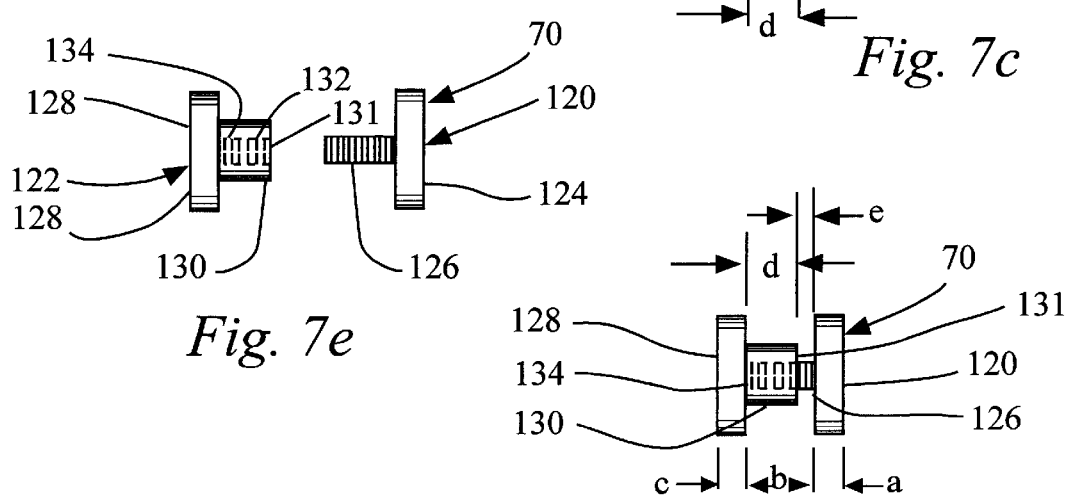
*Fig. 7e*
*Fig. 7d*

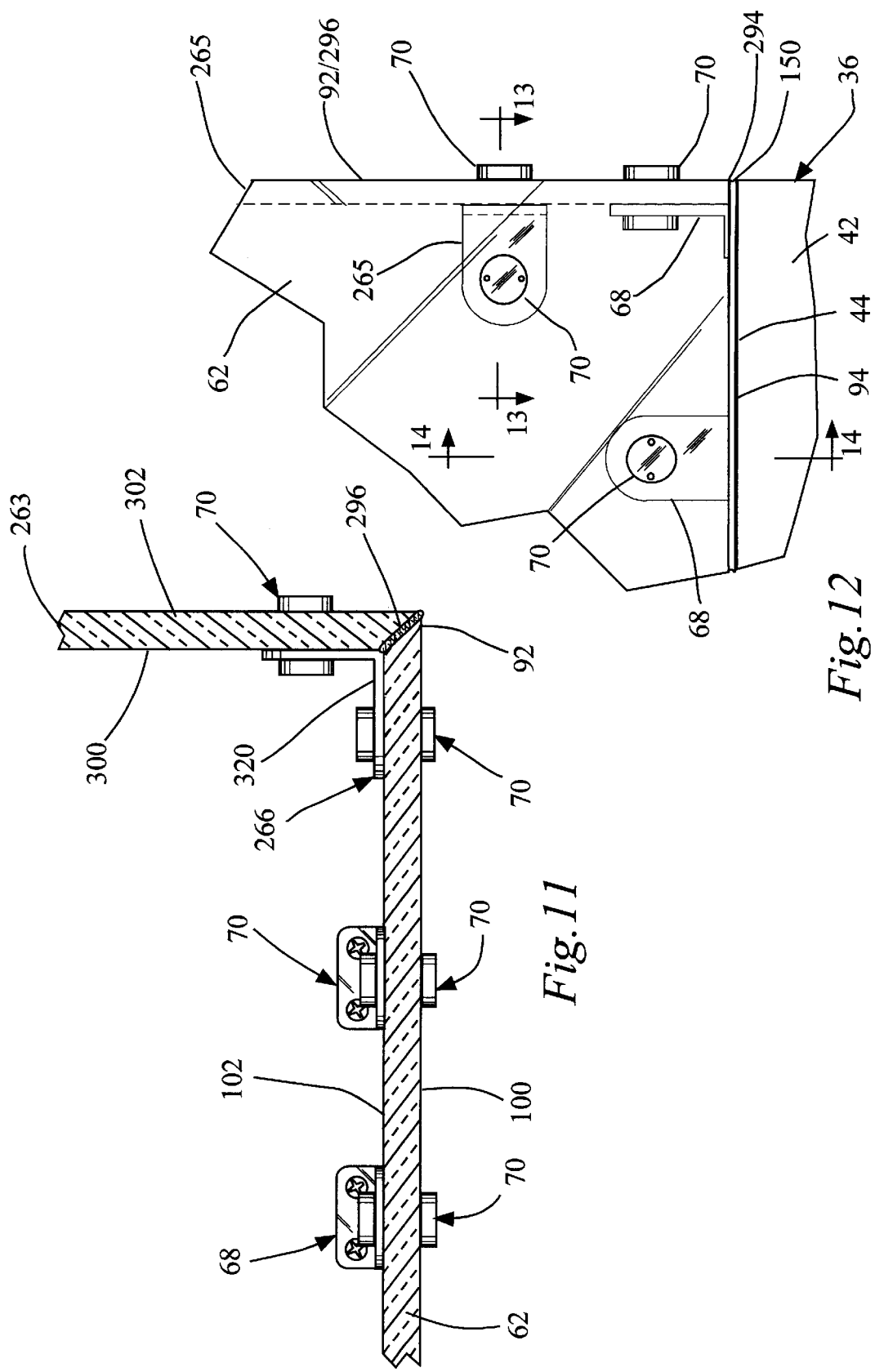

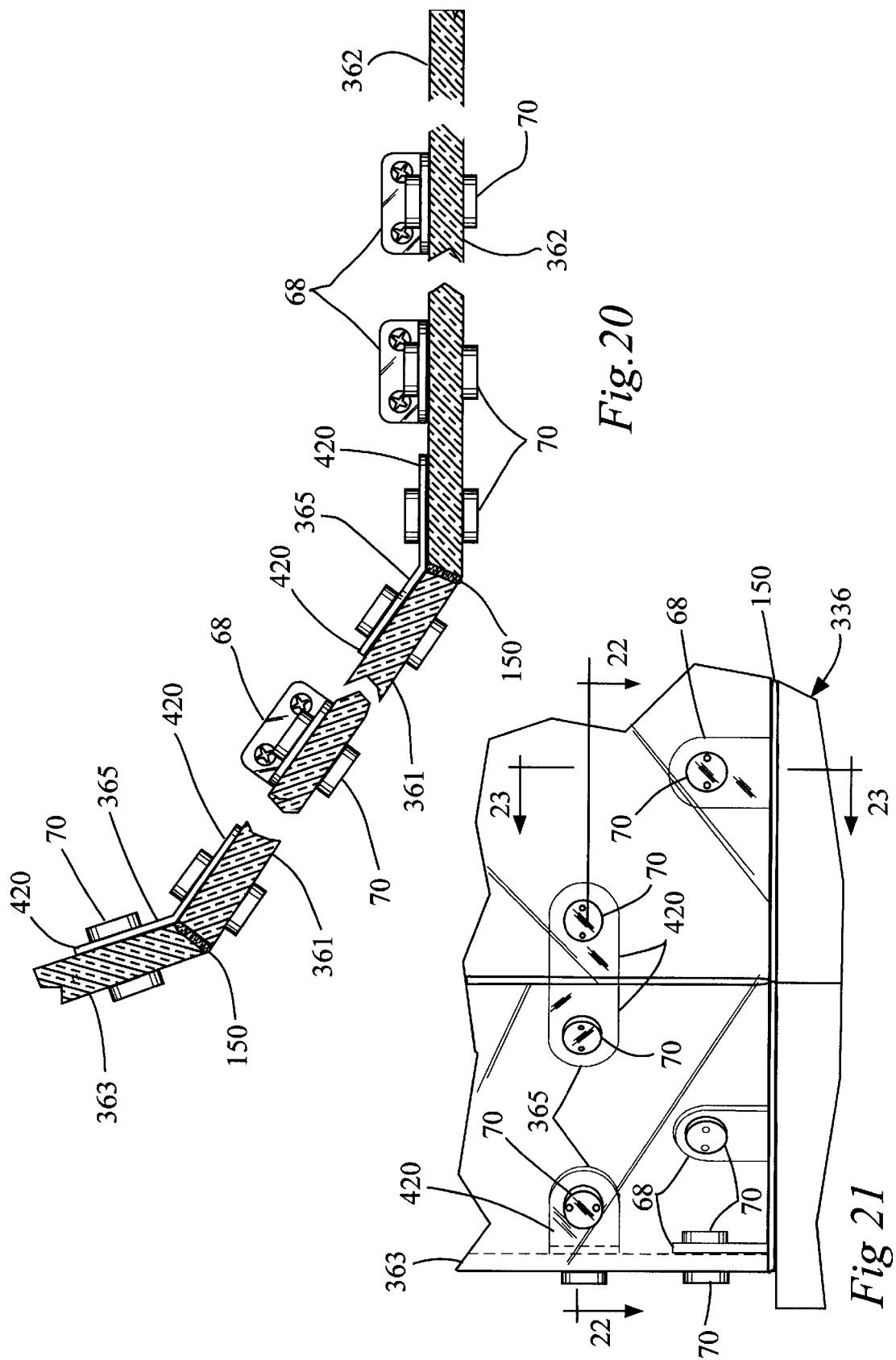

APPARATUS FOR SUPPORTING BATHING ENCLOSURE PANELS

FIELD

The present invention pertains to an apparatus for supporting bathing enclosure panels and more particularly to an apparatus for supporting heavy glass panels in a bathing enclosure without using metal frames or metal clips to support the panels.

BACKGROUND

As is well known, the standard shower enclosure in common use for many years comprises glass panels, typically 3/16" or 1/4" thick glass, supported in channel-shaped, metal frames. Each panel of glass, both the fixed panel or panels and the shower door panel, is entirely circumscribed by its frame. The outside vertical frame elements are securely fastened to the walls of the building in which the installation is located, the lower horizontal frame elements are secured to the shower pan or dam around the pan, and the upper horizontal frame element may be secured to an upper horizontally extending, box-shaped header. The structure is very secure, but the use of so much metal may detract from the visual appeal of the bathing unit or the bathroom in which it is located.

For the past several years, therefore, customer demand in shower enclosures has been increasingly away from the type of enclosure described above. More and more customers want less metal and heavier, i.e., thicker, glass, seemingly inconsistent objectives. In general, the demand is toward more transparency and the solid look and feel of thicker glass. The problem is how to support heavier glass without the strength of metal support.

Shower door manufacturers have attempted at least partially to satisfy this demand by providing a heavier glass fitted in a channel-shaped frame that is secured to the wall. The frame is typically of aluminum or polished brass and plated, and the glass is preferably sealed in the frame by silicone. This type of enclosure of course responds to the requirement for heavier glass but certainly not to less metal.

Other installations intended to meet this demand eliminate the metal frame and essentially replace its support function with a header or ceiling over the shower that is secured to the building wall. The fixed glass panels are attached to the header or ceiling and to each other by clear silicone, whereas the shower door is supported by metal hinges. The problem here is that clear silicone cannot be warranted as a structural element capable of supporting the glass, especially heavier glass. The primary function of silicone, therefore, is sealing, not supporting. Although more attractive, such installations lack the dependability required for a bathing enclosure.

To solve the problem of support without the metal frame around the entire panel, other manufacturers have used the header together with metal clips that clamp the frameless glass to the header and thereby hold it in place. These enclosures still use silicone between adjacent panels of glass as a sealant but not for the primary support. The clips are typically of the same metal as the frames previously used and are thus of either aluminum or polished brass and plated. Each clip consists of a bracket with right-angularly related flanges that are about 2" by 2" or larger, a pad opposite each flange, and screws extending through the pads and into mounting posts on the flanges. The glass is placed between a flange and its associated pad and clamped therebetween by tightening the screws. Channel-shaped metal frame elements may still be used to fasten the lower edges of the glass to the shower pan. Metal is thus minimized, but the need for many, very visible, metal clips spaced around the enclosure still detracts from the overall appearance of the enclosure. Also, the glass must be provided with a cutout notch to accommodate each clip, resulting in extra manufacturing cost and time.

SUMMARY

The present invention provides an apparatus for supporting heavy glass panels in a bathing enclosure without opaque metal frames or metal clips. Most importantly, the supporting apparatus includes transparent plastic support brackets and fasteners that attach to the heavy glass panels. These brackets and fasteners are used in a panel assembly to join an adjacent wall or pan to a fixed glass panel or panels and to join adjacent fixed glass panels to each. Although not relied on for support, clear sealant in the joints of the assembly enhances the overall integrity of the support. The combination provides dependable support while giving the enclosure a more transparent look. The brackets and fasteners are preferably molded of clear polycarbonate, which has the characteristics of transparency, strength, and moisture resistance needed, and the sealant is preferably silicone.

An object of the present invention is to support heavy glass panels in a bathing enclosure without using metal frames or metal clips to support the panels.

Another object is to use heavy glass panels in a bathing enclosure while minimizing the metal used to support the glass panels.

Yet another object is to increase the transparency of a bathing enclosure by minimizing the amount of opaque metal used and using transparent supporting elements instead.

A more specific object is to increase the transparency of a bathing enclosure by omitting metal frames and clips that have been used in the past to support glass panels of the enclosure, and particularly heavy glass panels of at least about 3/8" thickness.

An additional object is to provide clear plastic brackets and fasteners for supporting the glass panels of a bathing enclosure.

A still further object is to provide a bathing enclosure structure that includes one or more fixed panels that are supported on a pan and by a wall and to each other with clear plastic brackets and fasteners.

Another object is to provide a panel assembly for a bathing enclosure that is supported in the enclosure on the pan at the base of the enclosure and by the wall forming part of the enclosure by clear plastic support brackets and fasteners and wherein clear sealant is interposed the joints between the panels and the pan and the wall and between adjacent panels.

Yet another object is to support one or more fixed panels of heavy frameless glass in a bathing enclosure by clear plastic brackets and fasteners interconnecting the panels and by other clear plastic brackets and fasteners that attach to the panels and are attached to the pan and adjacent wall by metal screws, such panels thusly supported being capable of supporting a door panel hinged to one of the fixed panels.

A feature of the present invention is the use of polycarbonate as the clear plastic for the support brackets and fasteners wherein the brackets and fasteners are not only clear but have such advantages as high impact strength, moisture resistance, and moldability.

These and other objects, features and advantages of the present invention will become apparent upon reference to the following description, accompanying drawings, and appended claims.

DESCRIPTION OF THE DRAWINGS

FIG. 7a is an enlarged exploded isometric view of a fragment of a glass panel, of the support bracket, of the fastener for fastening the support bracket to the glass panel, and of screws to fasten the support bracket to a supporting structure, such as a wall.

FIG. 7b is a detail view of the wall or pan support bracket shown in FIGS. 1–6.

FIG. 7c is a view of the wall or pan support bracket shown in FIG. 7b in engagement with a fragment of a glass panel and in alignment with the glass panel prior to being fastened thereto with a fastener.

FIG. 7d is a side elevation of one of the fasteners used to fasten the support bracket to the glass panel, with the male and female connectors of the fastener being interconnected, it being noted that the fastener of FIG. 7d is oriented relative to the support bracket and glass panel shown in FIG. 7c so that certain dimensional relationships between these parts may be identified.

FIG. 7e is a side elevation of the fastener shown in FIG. 7d with its male and female connectors separated.

FIG. 11 is an enlarged horizontal fragmentary section taken on line 11—11 in FIG. 9.

FIG. 12 is an enlarged detailed fragmentary elevation of the area of the bathing enclosure structure within the dashed circle shown in FIG. 9.

FIG. 20 is a fragmentary horizontal section taken on line 20—20 in FIG. 18.

FIG. 21 is an enlarged detailed fragmentary elevation of the area of the bathing enclosure within the dashed circle shown in FIG. 18.

DETAILED DESCRIPTION

Figure 1:
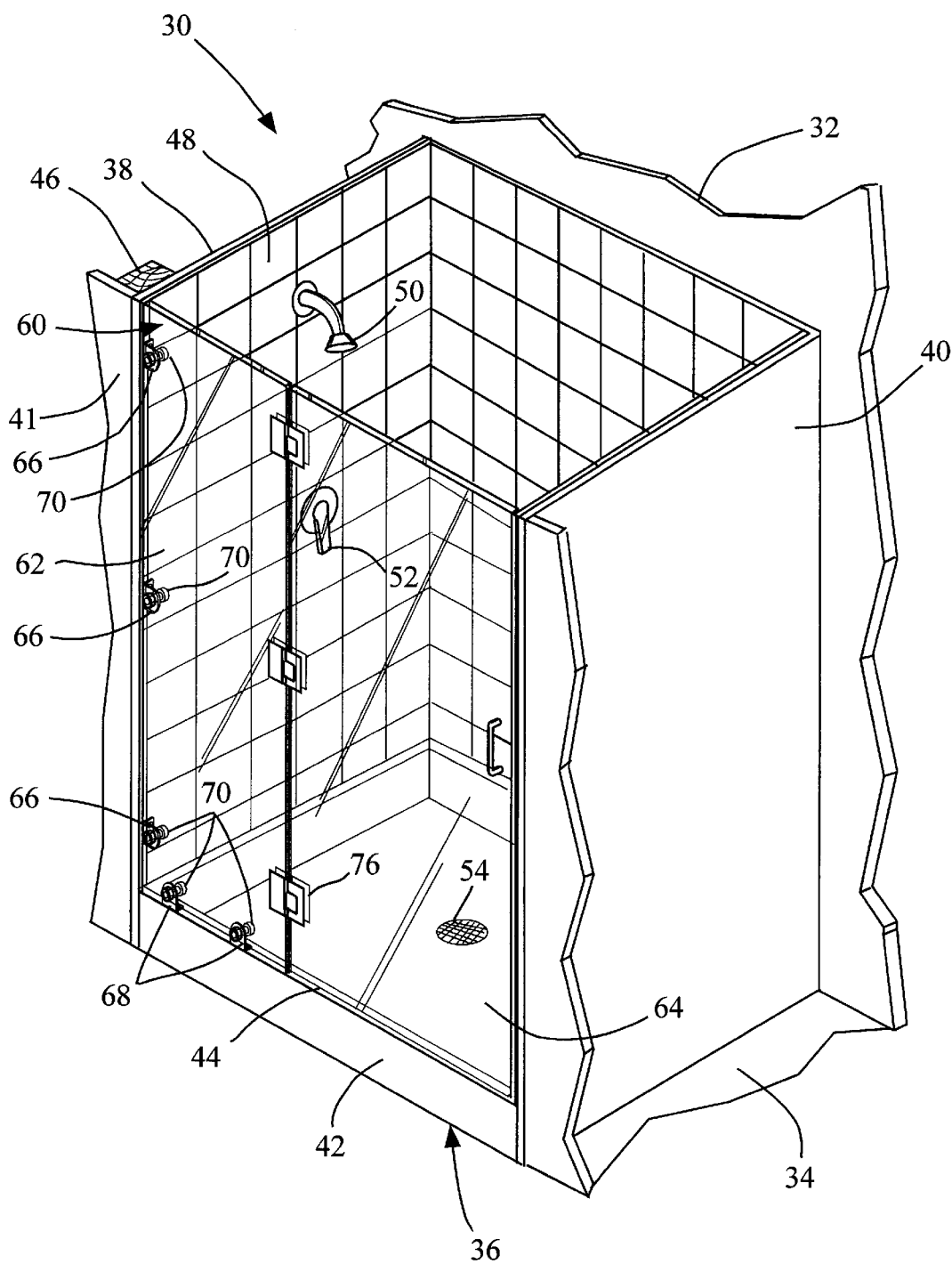
FIG. 1 is an isometric front view of one embodiment of a bathing enclosure incorporating the principles of the present invention, with only fragments of the walls around the enclosure being shown, it being noted that such accessories as soap trays, seats, and other amenities are omitted since they form no part of the present invention.
Figure 2:
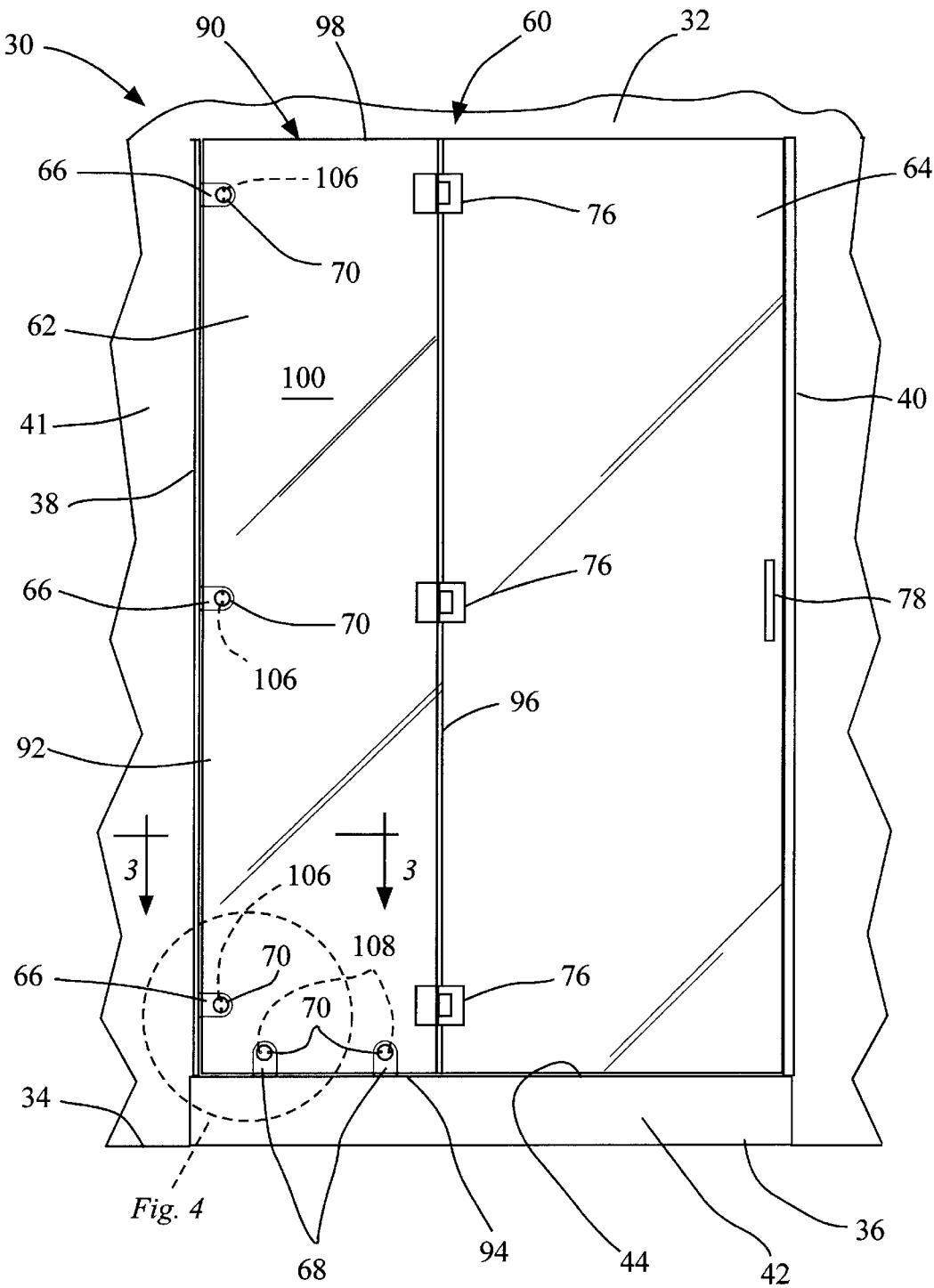
FIG. 2 is an enlarged front elevation of the bathing enclosure shown in FIG. 1, it being noted that although the panel assembly of the structure is transparent, the showerhead and tiles seen in FIG. 1 are not shown in the background for reasons of clarity.
Figure 3:
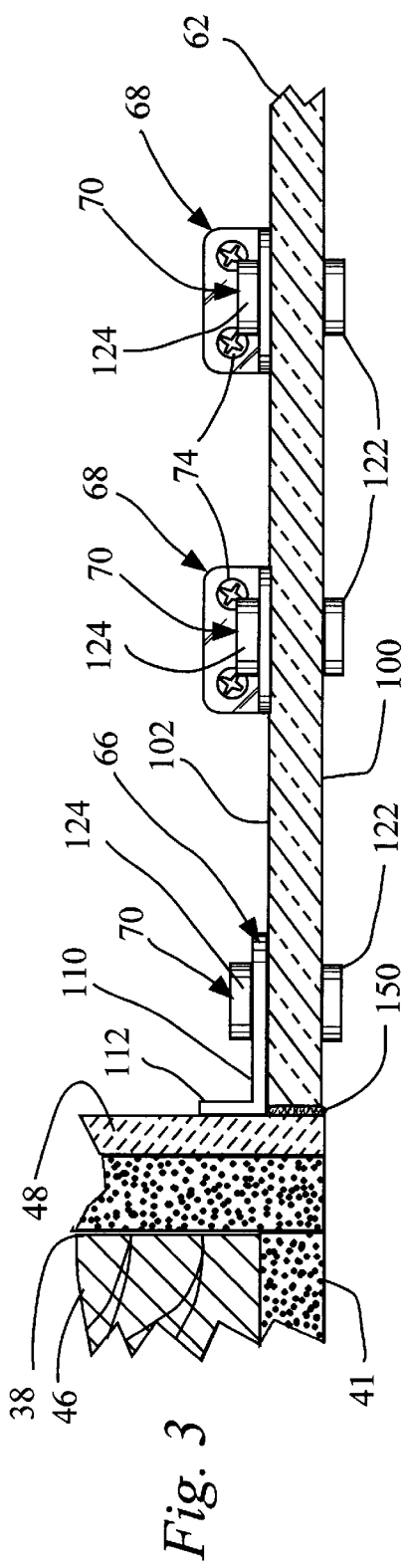
FIG. 3 is an enlarged fragmentary horizontal section taken on line 3—3 in FIG. 2.
Figure 4:
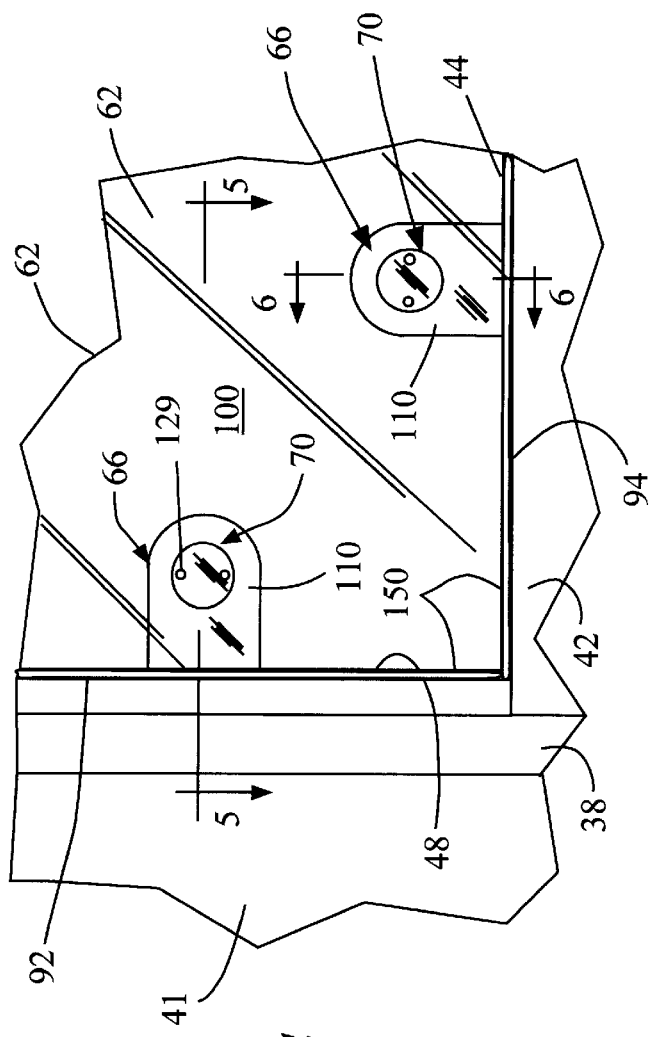
FIG. 4 is an enlarged detailed elevation of the area indicated by the dashed circle in FIG. 2.

A first embodiment of a bathing enclosure, more specifically a shower, incorporating the structural features of the present invention is generally indicated by the number 30 in FIGS. 1 and 2. As is typical, the bathing enclosure is installed in a building having a back wall 32 which may be composed of dry wall covered by tile, a floor 34, a shower pan 36 on the floor, and first and second side walls 38 and 40 projecting outwardly from the back wall. As further well-known environment in which to describe the features of the present invention, the pan has a vertical dam 42 providing an upwardly facing, flat, horizontal supporting surface 44 (see also FIG. 6). The first side wall includes a vertical stud 46 and provides an interior, vertical supporting surface 48. In addition, although forming no part of the present invention, the bathing enclosure includes a showerhead 50, a valve 52, and a drain 54. Such additional features as soap trays, shelves, seats and other amenities have been omitted for clarity since they form no part of the present invention.

The bathing enclosure 30 (FIGS. 1 and 2) includes a panel assembly 60 having a fixed panel 62 (on the left in FIGS. 1 and 2); a door panel 64 (on the right in FIGS. 1 and 2); a plurality of side and bottom brackets 66 and 68 (which are identical but are given different numbers for descriptive convenience); panel, wall, and pan fasteners 70, 72 and 74; metal hinges 76 that support the door panel on the fixed panel; and a handle 78 on the door.

The present invention is particularly concerned with the structural features of the bathing enclosure 30 (FIGS. 1 and 2) that enables the fixed panel 62 to be dependably supported on the pan 36 and the first side wall 38 in such a way as to maintain not only the fixed panel in position but also to enable the door panel 64 to be hung on the fixed panel for hinged movement between open and closed positions, wherein the only metal used in the panel assembly 60 is that of the hinges 76. The manner in which the subject invention accomplishes this result is described below.

The fixed panel 62 (FIGS. 1–6) is transparent, that is clear, tempered glass having a flat or planar peripheral edge 90 that is frameless. As is well known, shower doors are conventionally supported in a metal frame that circumscribes the panel. The features of the present invention allow such a frame to be eliminated, not only on the fixed panel, but also on the door panel 64. The peripheral edge includes an inner edge 92, a bottom edge 94, an outer edge 96, and a top edge 98. The fixed panel has a planar outside surface 100, a planar inside surface 102, a thickness dimension measured from the inside surface to the outside surfaces, a height dimension measured from the bottom edge to the top edge, and a width dimension measured from the inner edge to the outer edge. Upper, lower and middle holes 106 are spaced along the inner edge of the fixed panel in inwardly adjacent spaced relation to the inner edge and extending all the way through the panel from the inside surface to the outside surface. Similarly, a pair of bottom holes 108 are spaced along the bottom edge of the panel in upwardly adjacent spaced relation to the bottom edge and extending all the way through the panel from the inside surface to the outside surface.

Although the present invention is not limited to particular dimensions, certain dimensions and dimensional relationships may help to obtain an understanding the significance of the structural features that are part of the present invention. Thus, whereas glass panels used in conventional shower enclosures have a thickness from about 3/16" to about 1/4", the present invention allows the use of much thicker glass, at least much thicker in the context of what has been conventional in such enclosures. For example, the subject invention allows the use of glass from about 3/8" to about 1/2" in thickness in its thickness dimension. This is true not only for the fixed panel 62 but also for the door panel 64. Glass panels that exceed about 3/8" in thickness may be referred to as "heavy" glass in this environment. That is, for a 3/8" thick glass, the glass weighs about five pounds per square foot and for 1/2" thick glass, the weight is about seven and one-half pounds per square foot. Thus, for a glass panel that is about six feet high by eighteen inches wide, the weight of the panel is about forty-five pounds for 3/8" glass and about sixty-seven and a half pounds for 1/2" glass. Moreover, for a door panel that may typically be about twenty-eight inches wide, the weight for 3/8" glass is about seventy pounds and for 1/2" glass is about one hundred pounds. Thus, the combined weight of the fixed and door panels using 3/8" glass is about one-hundred fifteen pounds, and the combined weight of both these panels for 1/2" glass is about one-hundred seventy-three pounds.

Such heavy glass panels 62 and 64 (FIGS. 1–7) could of course be readily supported by the conventional metal frames or with metal clips. As stated above, however, an objective of the invention is to be able to use heavier glass with less metal, so the use of metal frames or clips would detract from the desired appearance of the bathing enclosure. Accordingly, the present invention provides the support brackets 66 and 68 and the fasteners 70 all of which are made of a transparent, that is, clear, strong plastic and are therefore structural elements. The preferred plastic is polycarbonate since it is not only optically clear but also has good impact and tensile strength, is moisture resistant, and is also moldable. Other plastics that are presently known to have these qualities or that may be eventually discovered to have them may also be used. Acrylic and cellulose butyrate might also be used, but they do not excel in all of the qualities noted above to the same extent as polycarbonate and are not thus preferred.

The side and bottom brackets 66 and 68 (FIGS. 1–7) are all identical so the same numbers will be used for all parts of each bracket. With particular reference to FIGS. 7a–7c, the brackets have a long panel flange 110 and a short wall flange 112 and are preferably molded in one piece with these flanges in a 90-degree relationship to each other. The long flange has a slot 114, either circular or elliptical, located generally centrally thereof, if elliptical as shown, its major axis extends lengthwise of the flange. The short flange has a pair of countersunk apertures 116 therein. Although the present invention is not limited to particular dimensions, an example of the preferred size of the side and bottom support brackets may be useful in appreciating the capabilities and advantages of the subject invention. Thus, the preferred dimensions of the panel flange are as follows: length about 1.870", width about 1.50", and thickness about 0.188". Preferably, the short flange has a length dimension of about 1.50" (the same as the width dimension of the panel flange), a width dimension of about 0.68", and a thickness of about 0.188" (the same as the thickness of the panel flange).

The panel fasteners 70 are all identical so that the same reference numerals are used for all parts of these fasteners. Thus, by particular reference to FIGS. 7a, d and e, each panel fastener has a male connector or stud 120 and a female connector or knob 122 that are threadably interconnected. The male connector has a cylindrical head 124 and an externally threaded shank 126 concentrically extended from the head. The female connector also has a cylindrical head 128 of the same size as the male head 124 and a shank 130 concentrically extending from the female head and terminating in an end face 131. The female shank has a socket 132 that is threaded to receive the shank 126 of the male connector. This socket does not extend through the female head but has a blind bottom 134 terminating at the female head. Two small cavities 129 are located in the outside face of the female head primarily to facilitate removal of the female connector from the mold in which it is made. These cavities may also be useful in attempting to thread or unthread the male and female connectors in use of the present invention, but, under ordinary circumstances, they are unnecessary for this purpose.

The head 124 of the male connector 120 (FIG. 7d) has a thickness identified by the letter a, and the shank 126 has a length identified by the letter b. The head 128 of the female connector 122 has a thickness identified by the letter c, and the shank has a length identified by the letter d. The thicknesses a and c are preferably equal to each other, but the length b of the male shank 126 is slightly greater than the length d of the female shank 130. In use, the male shank 126 is threaded into the socket 132 until the end of the shank 126 engages the blind bottom 134 and is fully seated against this bottom. Since the length of the shank 126 is greater than the length of the shank 130, there remains a gap e between the end face 131 of the female shank and the inside face of the male head in the fully interconnected positions of the male and female connectors. There is a relationship between the above-described dimensions of the panel fasteners 70 and both the support brackets 66, 68 and the glass panel 62, as best illustrated by FIGS. 7c and 7d. That is, the length d of the female shank 130 is approximately equal to the thickness of the panel 62, and the gap e is approximately equal to the thickness dimension of the panel flange 110.

As an example of the dimensions of the panel fasteners 70, the diameter of each head 124 and 128 is preferably about 1.00" and its thickness a or c is about 0.156". The length b of the male shank 126 is preferably about 0.520", the length d of the female shank 130 and also the length of the socket 132 are preferably about 0.350". The outside diameter of the shank 130 is about 0.500" and is drilled and tapped with a 5/16-24 thread. Further, the male shank 126 has a 5/16-24 thread and thus has a diameter slightly less than the minor axis of the slot 114 in the panel flange 110.

The wall fasteners 72 (FIG. 7a) are flathead screws, preferably number 8-1¾ to 2½" sheet metal screws. The pan fasteners 74 are also flathead screws, preferably number 8-⅜" sheet metal screws.

Installation of the panel assembly 60 may vary depending on the preferences of the installer. As an example of an installation sequence, however, the fixed panel 62 and the door panel 60 are assumed not to be attached to each other prior to installing the panel assembly in the bathing enclosure 30 (FIG. 1). The hinges 76 may be attached to the fixed panel 62 in a well-known manner, form no part of the present invention, and are thus not described in any further detail. As stated, however, the door panel is not yet hung on the hinges.

As a first step, the side and pan support brackets 66 and 68 (FIGS. 5, 6, and 7a–7e) are attached to the fixed panel 62 by attaching the panel flange 110 of each bracket to the fixed panel with the panel fasteners 70. The panel flange is placed against the inside surface 102 of the fixed panel with the slot 114 therein aligned with one of the upper, lower or middle holes 106 in the fixed panel. The shank 130 of the female connector is slid into the hole 106 of the glass, it being noted that the end face 131 of this shank is co-terminus with the inside surface of the fixed panel when the inside face of the female head 128 is against the outside surface 100 of the glass panel.

Figure 5:
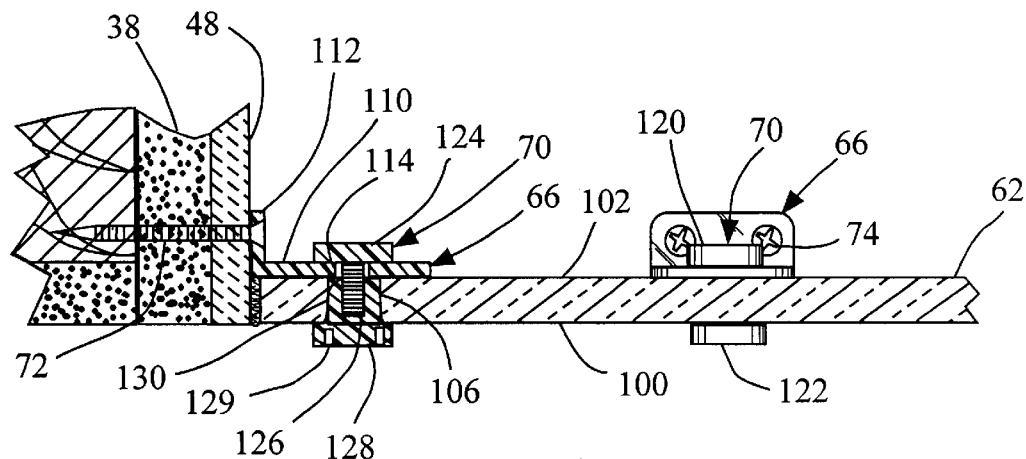
FIG. 5 is a fragmentary horizontal section taken on line 5—5 in FIG. 4.
Figure 6:
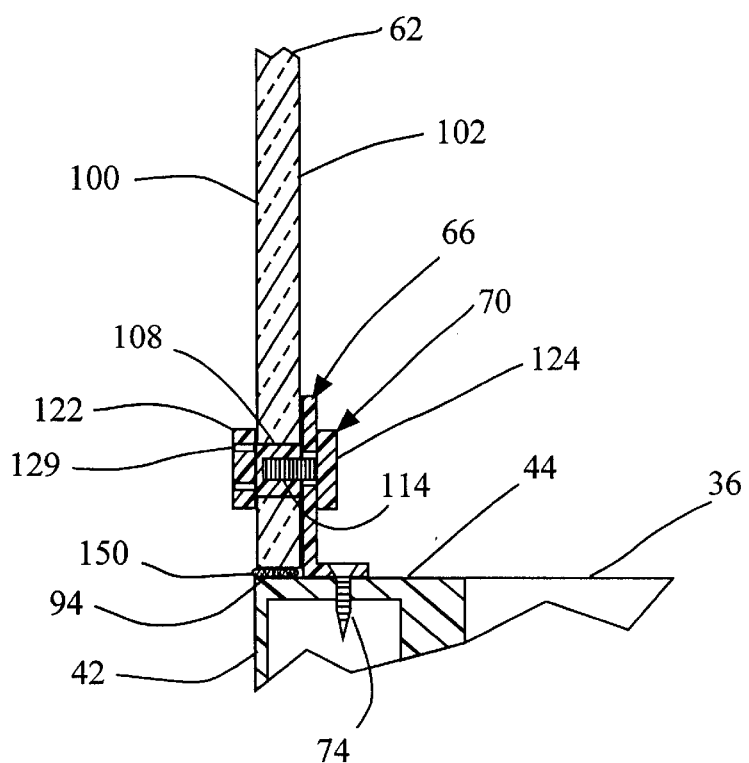
FIG. 6 is a fragmentary vertical section taken on line 6—6 in FIG. 4

The male shank 126 (FIGS. 5, 6, and 7a–7e) of the male connector 120 is then threaded into the socket 132 of the female shank 130 until the end of the male shank 126 is against the bottom 134 of the female socket. At this time, the inside face of the female head 128 is in tight engagement against the outside surface 100 of the glass panel, and the inside face of the male head is in tight engagement against the outside face of the panel flange 110. In this position, both the panel flange and the fixed glass panel 62 are snugly sandwiched between the heads 124 and 128 of the fastener. All five support brackets 66 and 68 are attached to the fixed panel with their respective panel fasteners 70 in the manner just described. FIG. 5 shows one of the side brackets so attached; FIG. 6 shows one of the bottom brackets 68 so attached; and FIGS. 7a–7e show more details of the connection.

Several features of the connection (FIGS. 5, 6, and 7a–7e) of the fasteners 70 to the glass panel 62 are to be noted since they lend strength to the panel support. First, the larger diameter female shank 130, rather than the smaller male shank 126, fits in the hole of the glass. Secondly, a close tolerance exists in the fit between the shank 130 and the hole 106 so that there will be no appreciable transverse movement therebetween; the thickness of the glass and corresponding length of the female shank even enhances their connection and relationship. Third, the panel flange 110 is sandwiched snugly between the female shank and the male head 124. Fourth, the glass panel is snugly sandwiched between the female head and the panel flange. All of these features provide for a more dependable connection and support. Moreover, these features exist in the connection of all the fasteners and brackets to the glass panel or panels in the other embodiments of this invention.

With the wall and panel brackets 66 and 68 and fasteners 70 attached as described, the panel 62 is ready for installation. Thus, the fixed panel 62 (FIGS. 1–5) is positioned in the entrance to the bathing enclosure 30 with the bottom edge 94 of the panel against the supporting surface 44, so that the panel rests on the pan 36 and the pan bears the weight of the panel, and with the inner edge 92 against the side wall 38. When properly positioned, the wall and pan flanges 112, as the case may be, are flush against the vertical supporting surface 48 of the side wall 38 or against the horizontal supporting surface 44 of the dam 42, and the outside surface 100 of the fixed panel is flush with the front wall 41 of the bathing enclosure. The wall fasteners 72 are then inserted through the apertures 116 of the wall flanges and threaded through the side wall 38 into the stud 46 thereof. Similarly, the pan fasteners 74 are inserted through the apertures in the pan flanges and threaded into the dam 42 of the pan. A bead or strip of sealant 150, preferably silicone, is applied along the joints between the inner edge 92 of the fixed panel 62 and the side wall 38 and between the bottom edge 94 of the fixed panel and the supporting surface 44 of the pan 36. These beads may be applied in several different ways, according to the preferences of the installer, namely, between the edges 92, 94 and the surfaces 48, 44, as shown in the drawings; along the inside seams between these edges and surfaces; or along the outside seams between these edges and surfaces.

If necessary during installation, the panel fasteners 70 may be backed off slightly to allow the fixed panel 62 to move slightly horizontally or vertically to insure that the weight of the fixed panel is borne by the pan 36 (FIG. 6) and that the fixed panel is tight against the wall 38. The pan fasteners are once again tightened so that the weight of the fixed panel is carried both by the side wall 38 as well as by the pan 36. Thereafter, the door panel 64 is hung on the fixed panel 62 by attaching the hinges 76 to the door panel in a well-known manner.

It will be understood, therefore (FIGS. 1–8), that the support brackets 66 and 68 and the fasteners 70, 72 and 74, together with the pan 36 and the silicone sealant 150, in combination, carry the weight of both the fixed panel and the door panel of heavy glass without the use of any separate supporting frame or metal clips. This supporting apparatus or structure is capable of supporting the heavy glass weights described above while providing much more transparency to the installation, provided, however, that for dependable support, the width of the heavy fixed panel 62 is limited to about eighteen inches in an installation of about five to six feet in height.

SECOND EMBODIMENT

Figure 8:
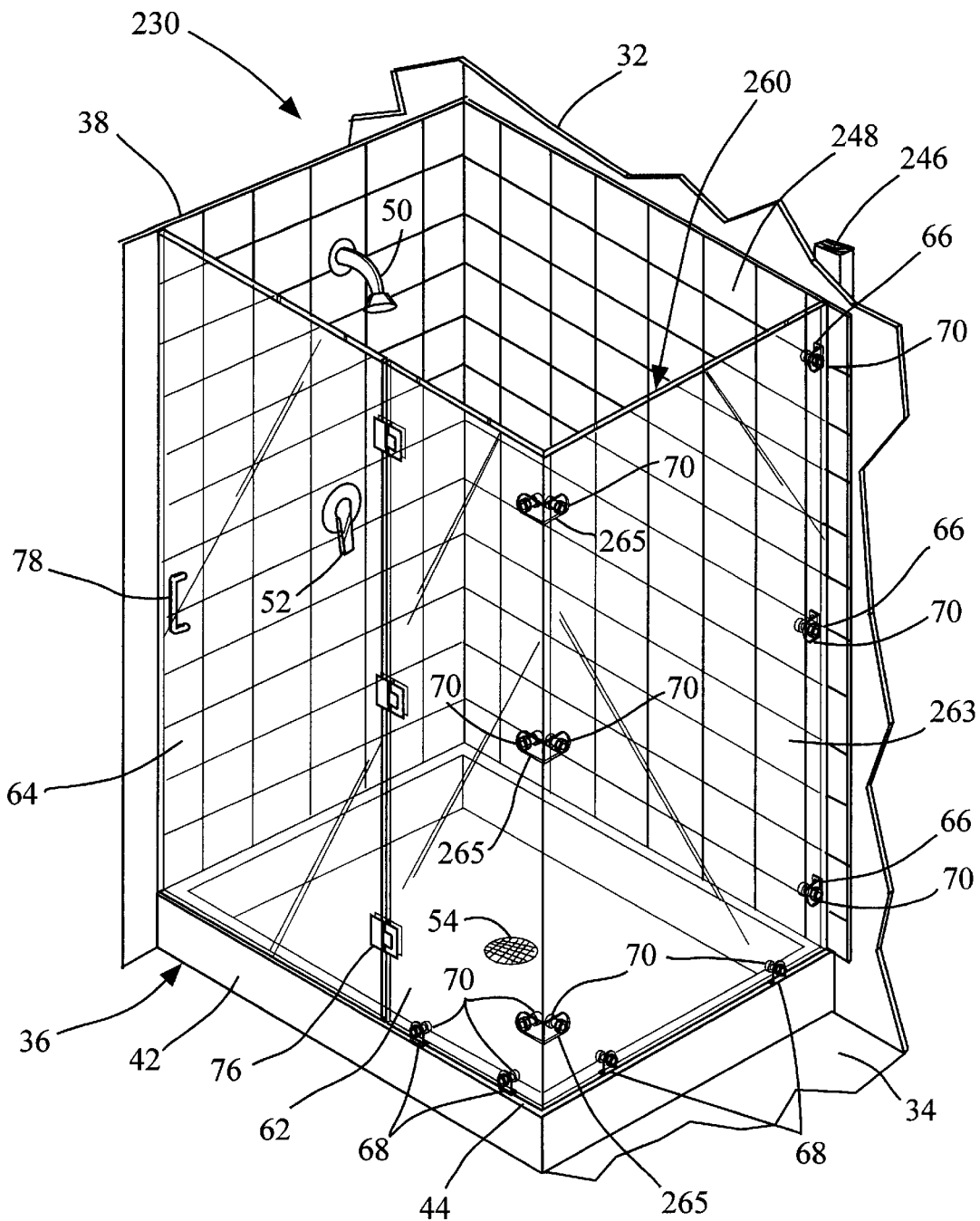
FIG. 8 is an isometric front view of a second embodiment of a bathing enclosure in accordance with the principles of the present invention, with only fragments of a wall against which the structure is located being illustrated, it again being noted that such accessories as soap trays, seats, and other amenities are omitted as they form no part of the present invention.
Figure 9:
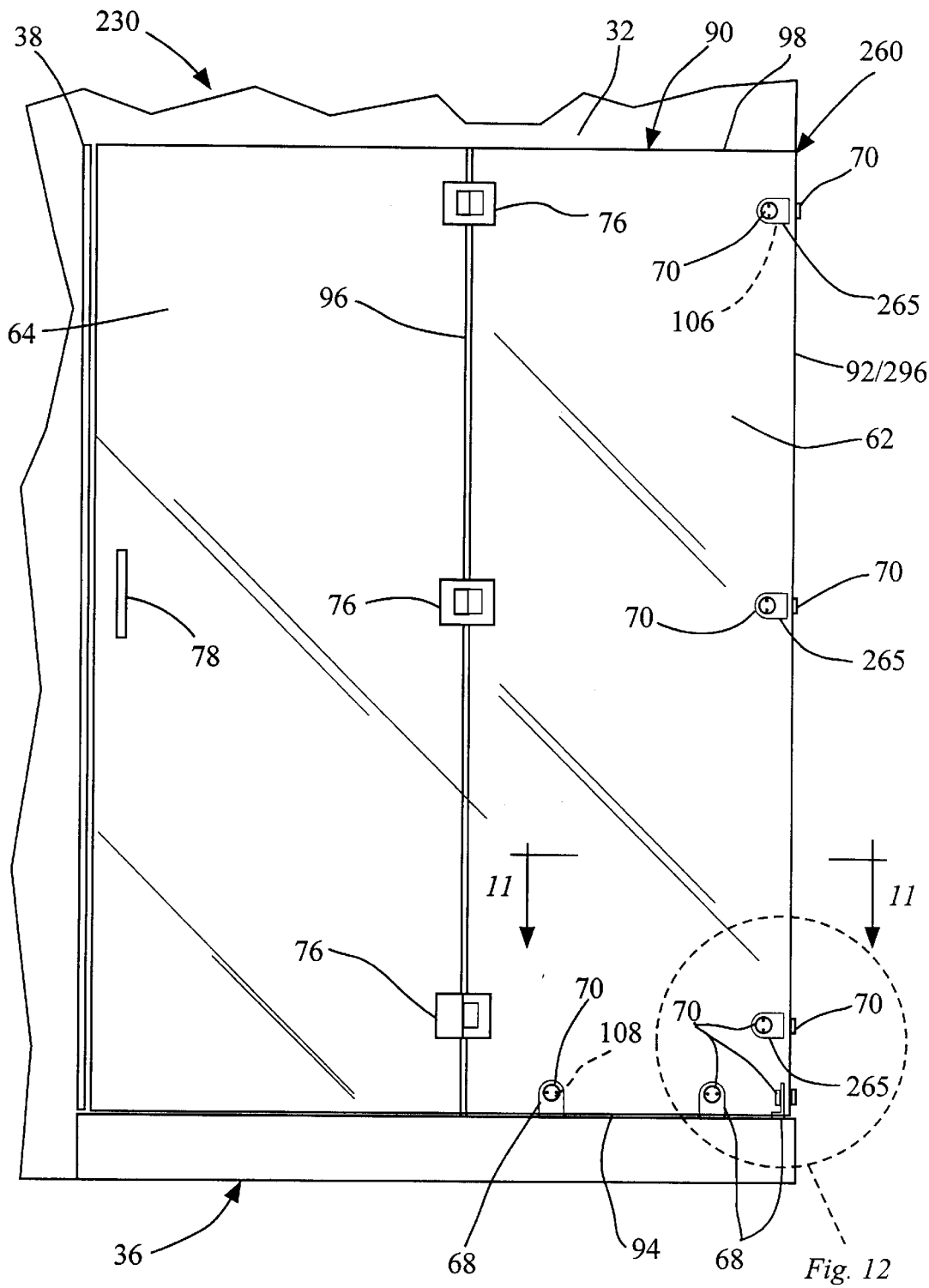
FIG. 9 is an enlarged front elevation of the bathing enclosure shown in FIG. 8.
Figure 10:
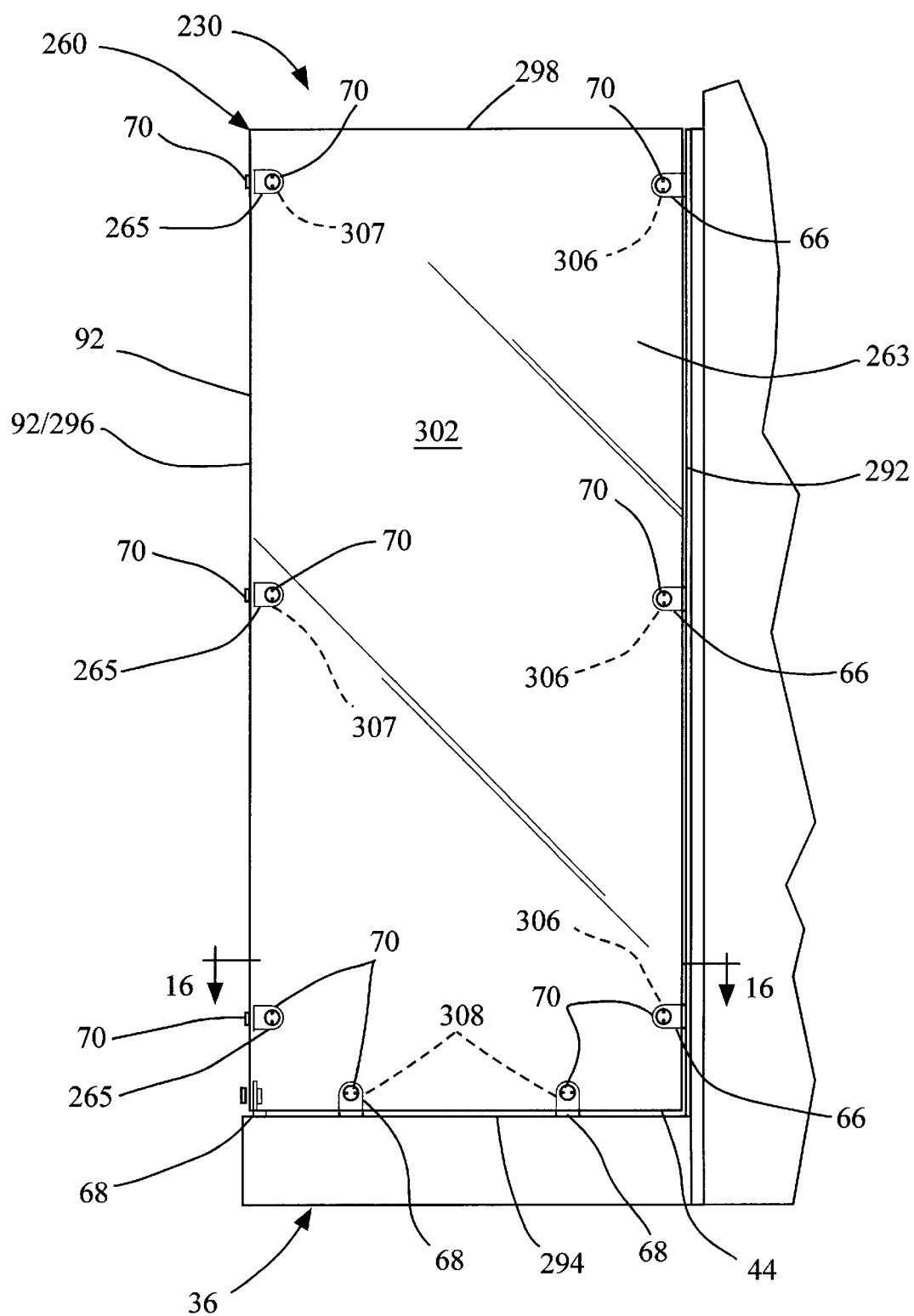
FIG. 10 is an enlarged side elevation of the bathing enclosure shown in FIG. 8.

A second embodiment of the bathing enclosure is generally indicated by the number 230 in FIGS. 8–10. The parts of the second embodiment that are the same as or similar to parts of the first embodiment are identified by the same or similar numerals. Thus, the bathing enclosure 230 includes a back wall 32, a floor 34, a pan 36, a side wall 38, a showerhead 50, a valve 52, and a drain 54. Moreover, the pan includes a dam 42 having a horizontal support surface 44. The back wall 32 includes a stud 246 and a vertical support surface 248.

A panel assembly of the second embodiment is generally indicated by the numeral 260 in FIGS. 8–10 and includes three panels, namely, the front fixed panel 62 and the door panel 64, both as in the first embodiment although reversed in position as compared with FIG. 1, plus a fixed side panel 263. In effect, the side wall 38 of the first embodiment is replaced by the fixed side panel 263 in the second embodiment. The side panel 263 is supported by the back wall 32, and the fixed front panel and the door panel are supported by the fixed side panel.

The fixed side panel 263 (FIGS. 8–10) is supported from the back wall 32 by the side support brackets 66 that are identical to the side support brackets used in the first embodiment, and is supported on the pan 36 by bottom support brackets 68, also in the same manner as the bottom brackets in the first embodiment. Also, panel, wall and pan fasteners 70, 72 and 74 are used with the side and bottom bracket in this second embodiment to attach the brackets to the wall or the pan and to the panel, all as described in connection with the first embodiment and not repeated here in detail. The manner in which the front and side panels 62 and 263 are interconnected, however, differs from the first embodiment and is now described in detail.

The side panel 263 (FIGS. 8 and 10) includes a peripheral edge 290 including an inner edge 292; a bottom edge 294; an outer edge 296; a top edge 298; an inside surface 300; an outside surface 302; upper, lower and middle holes 306 along the inner edge; upper, lower and middle holes 307 spaced along the outer edge; and bottom holes 308 spaced along the bottom edge. Except for its width, the side panel has the same characteristics as the front panel and as described in connection with the first embodiment, but summarized here. That is, the side panel is a panel of heavy clear, that is, transparent, glass having a thickness of between about ³⁄₁₆" and ½". The thickness of the side panel is the same as the thickness of the front panel for any particular installation so that the thicknesses of the door panel 64, the front panel 62 and the side panel 263 are all the same for a given installation. In addition, the height of the side panel is the same as the height of the fixed and door panels, being typically about five or six feet although being lower or higher depending on the installation. The width of the side panel is typically from about thirty inches to about thirty-six inches.

Figure 13:
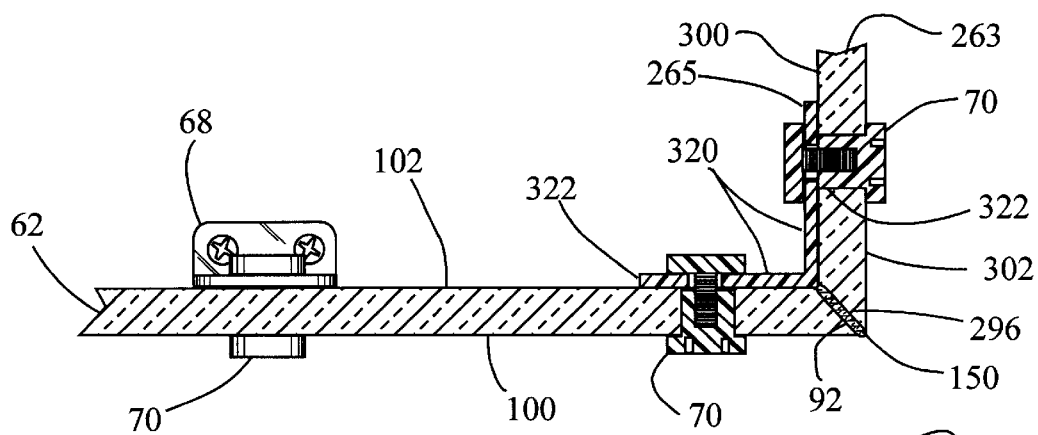
FIG. 13 is a fragmentary horizontal section taken on line 13—13 in FIG. 12.
Figure 14:
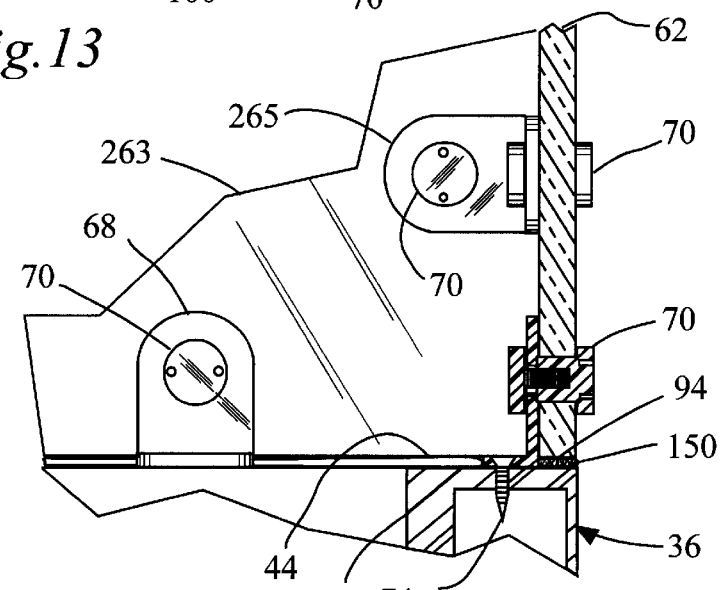
FIG. 14 is a fragmentary vertical section taken on line 14—14 in FIG. 12.
Figure 15:
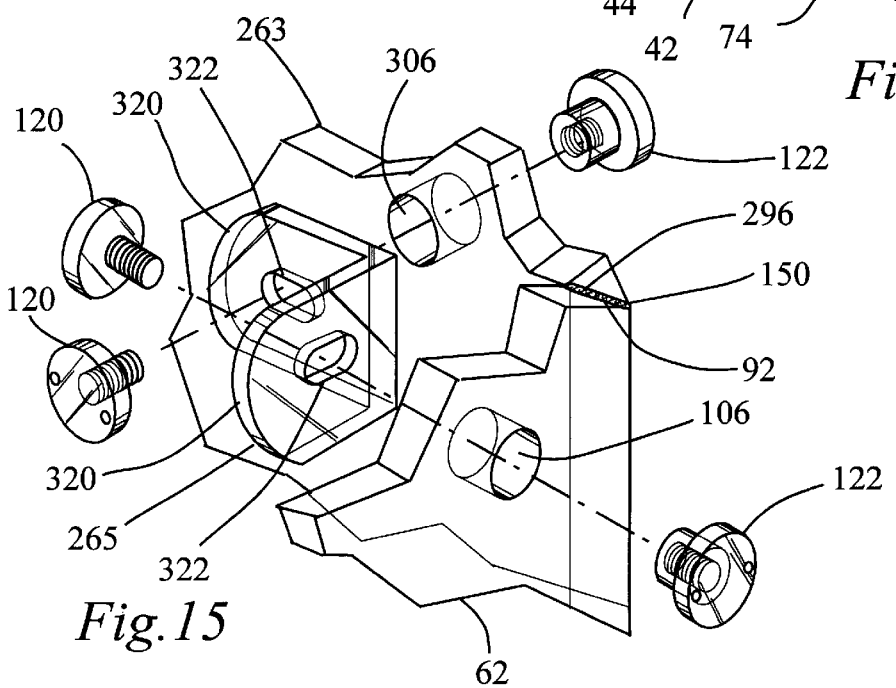
FIG. 15 is an enlarged, exploded isometric of two fragmentary panels of glass in edge-to-edge 90-degree relationship, with clear sealant in the joint, and also showing the support bracket and fasteners for connecting the two glass panels together.

The fixed front panel 62 (FIGS. 8–16) is attached to the fixed side panel 263 by a plurality of right-angular, spanning support brackets 265 of clear, i.e., transparent, plastic, preferably polycarbonate, all as described for the first embodiment. With particular reference to FIGS. 13–15, each spanning support bracket has a pair of panel flanges 320 extending from a juncture in ninety-degree relation to each other. As an example of a preferred size of each spanning bracket, the length of each flange is about 2.063", the width of each flange is about 1.50" (like the width of the brackets 66 and 68), and the thickness of each flange is about 0.188" (like the thickness of the brackets 66 and 68). Although these dimensions are preferred, the invention is certainly not limited to them. Each flange has a preferably elliptical slot 322 whose major axis extends lengthwise of its flange. The minor axis of each slot is large enough to accommodate the threaded shank 126 of the male connectors 120.

As before, the panel assembly 260 (FIGS. 8–16) may be installed in a variety of ways depending on the installer. One sequence of installation is as follows: The front and side panels 62 and 263 may be connected prior to installation in the bathing enclosure 230 or during installation, preferably the latter. If the latter, the side panel 263 is positioned on the pan 36 and against the back wall 32 and is attached to the back wall 32 and the pan 36 by the side and bottom brackets 66 and 68 and their associated fasteners 70 as previously described in connection with the front panel in the first embodiment of the invention. The front panel is then positioned on the pan at the location shown in FIG. 8 and in right-angular relation to the side panel and with the edges 92 (of the front panel) and 296 (of the side panel) in edge-to-edge relationship. For this purpose, the edges 92/296 of these two panels are mitered at a forty-five degree angle as best illustrated in FIGS. 11, 13, 15 and 16. The front panel is attached to the pan by the bottom brackets 68 in the same manner as described with regard to the first embodiment.

Figure 16:
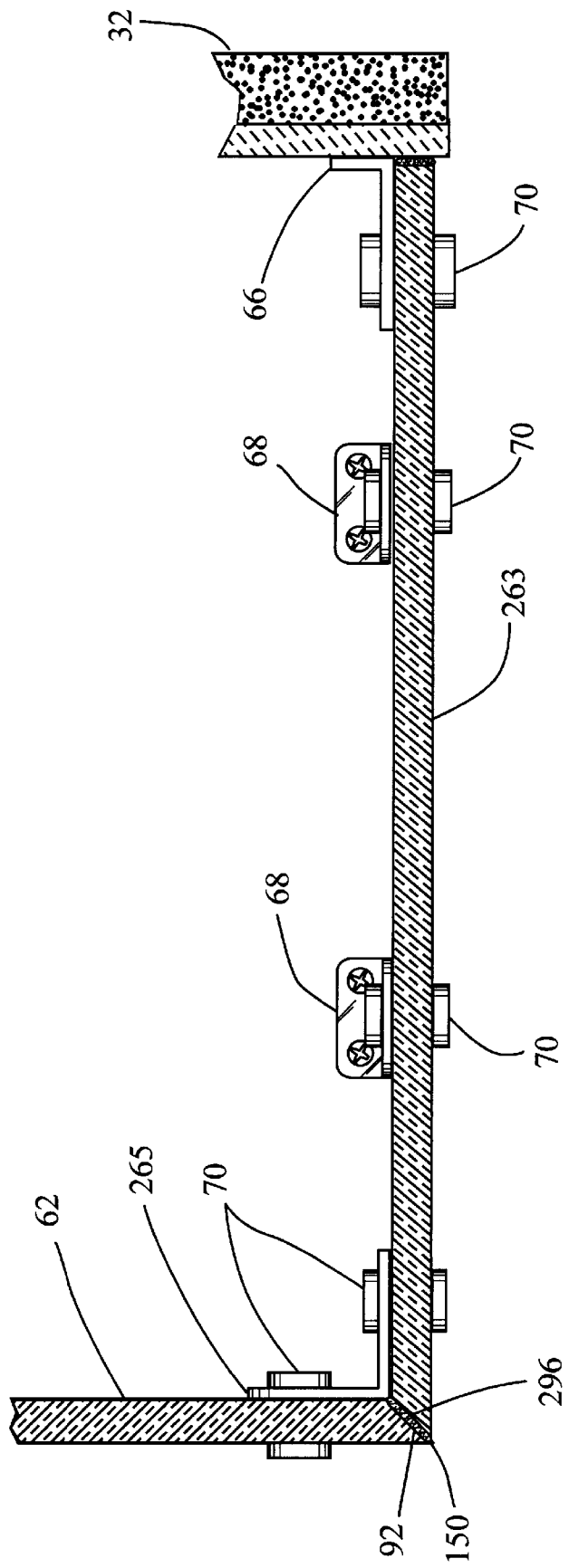
FIG. 16 is an enlarged fragmentary horizontal section taken on line 16—16 in FIG. 10.

The front and side panels 62, 263 are attached to each other by the spanning brackets 265 in the following manner: It is first to be observed that when the front and side panels are in their described right-angular relationship in the bathing enclosure 230, the upper, lower and middle holes 106 and 307 are aligned. A spanning bracket 265 is positioned on the inside surfaces of the front and side panels over each pair of aligned holes with their respective panel flanges 320 against the inside surfaces 102 and 300 of their respective panels. As best illustrated in FIGS. 11, 13 and 16, the spanning brackets fit neatly and snugly in the corner defined between the front and side panels. Also, in these positions, the slots 322 in the panel flanges are aligned with the holes 106 and 307, respectively. When each spanning bracket is thusly located, it is attached to the panels by the fasteners 70, as previously discussed with regard to the support brackets 66 and 68. As before, the elliptical slots in the flanges allow for some adjustment between the panels to ensure their proper supported location in the bathing enclosure 230. Also, as with the first embodiment, silicone 150 is placed in the juncture (between the edges or along the edges) between the front and side panels, between each panel and the pan 36, and between the side panel and the back wall, all as illustrated in FIGS. 11–14 and 16.

After the front and side panels 62 and 263 have been thusly installed, the door panel 64 is hung on the front panel by the hinges 76. When complete, therefore, the panel assembly 260 with frameless panels of heavy glass is supported in the bathing enclosure 230 by the transparent support brackets 66, 68, and 265 on the back wall 32 and on the pan 36, without using a metal frame or metal clips, thus having the same significance and advantages as described for the first embodiment.

THIRD EMBODIMENT

Figure 17:
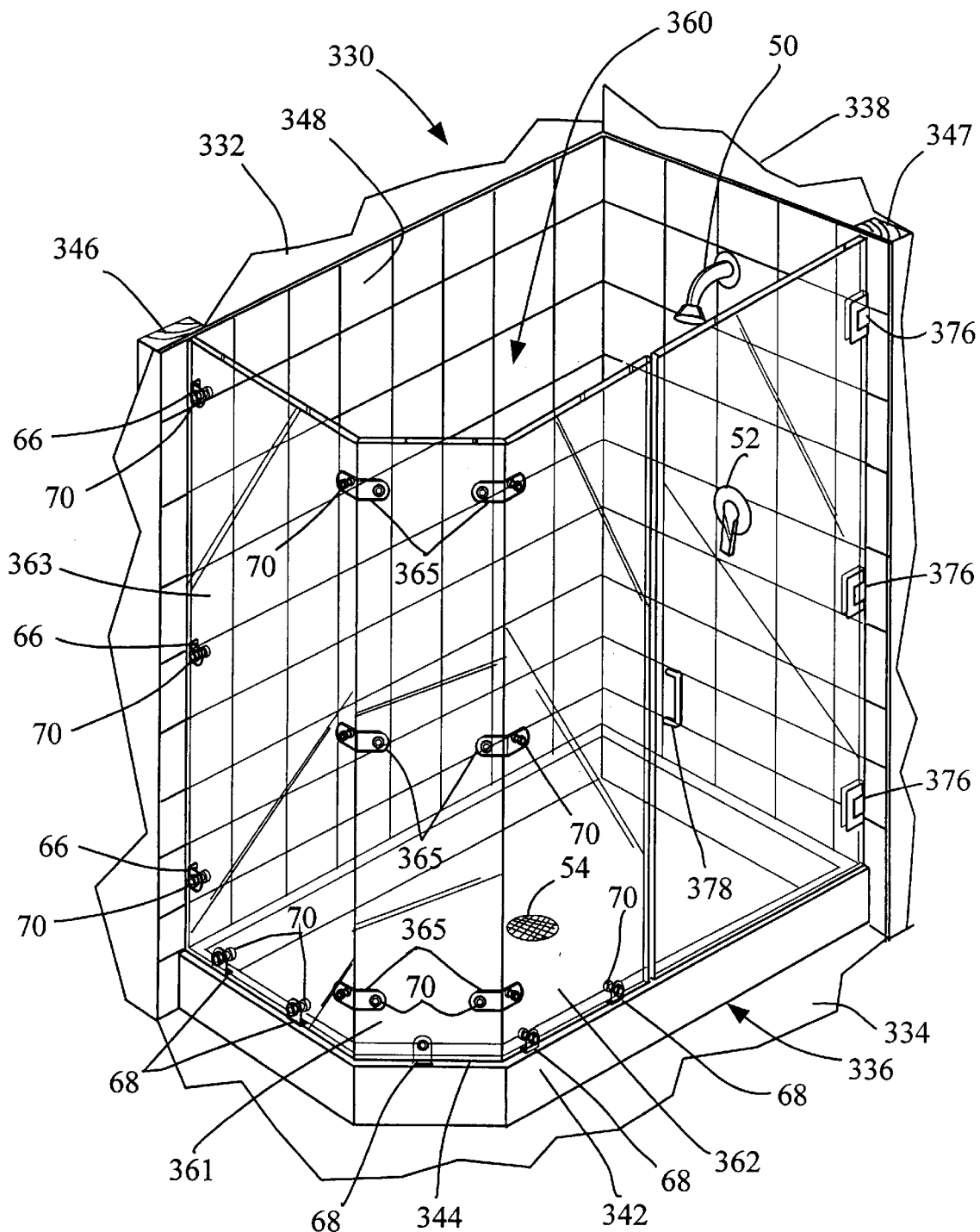
FIG. 17 is an isometric front view of a third embodiment of a bathing enclosure in accordance with the principles of the present invention, it again being noted that such accessories as soap trays, seats, and other amenities are omitted as they form no part of the present invention.
Figure 18:
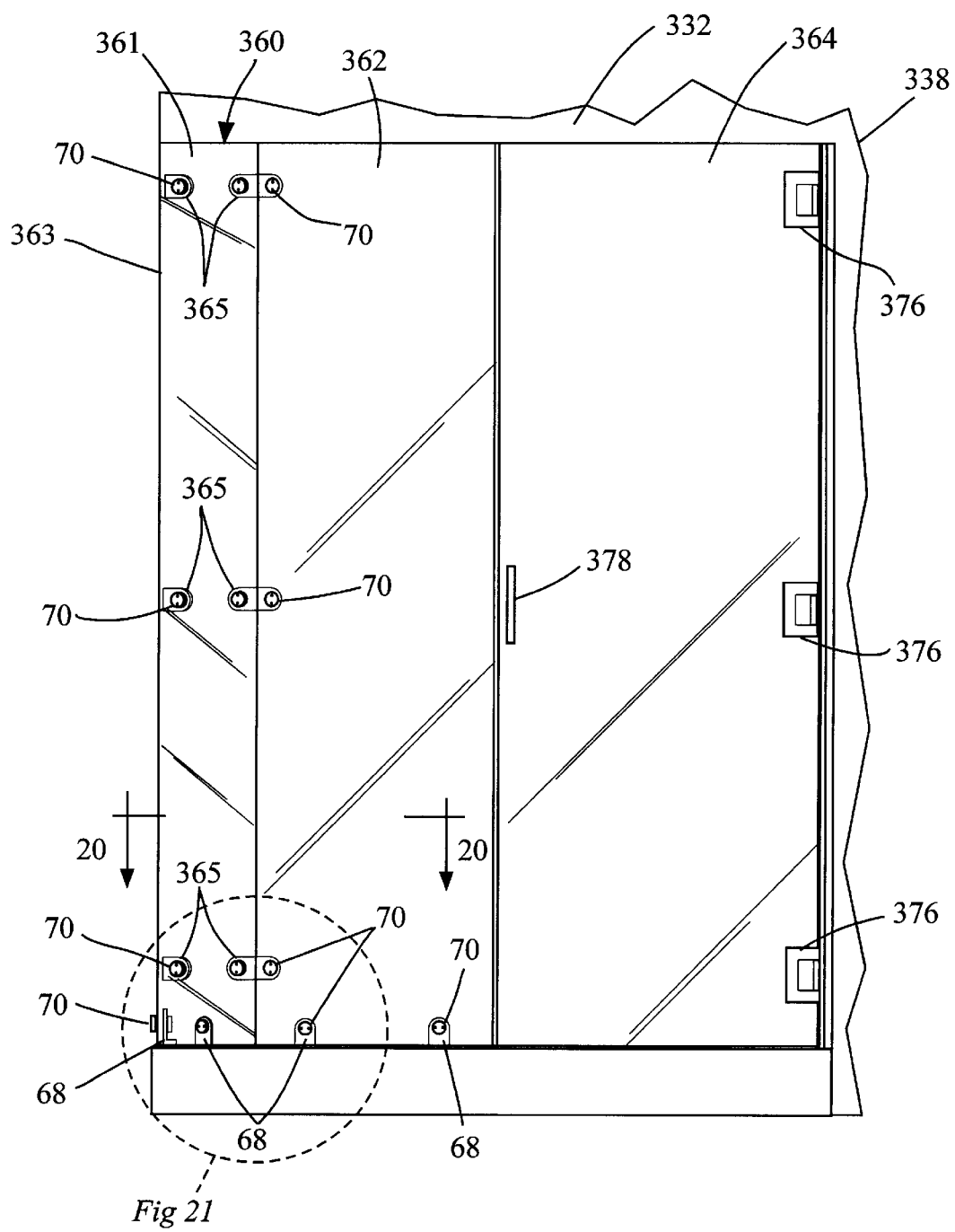
FIG. 18 is an enlarged front elevation of the bathing enclosure shown in FIG. 17.
Figure 19:
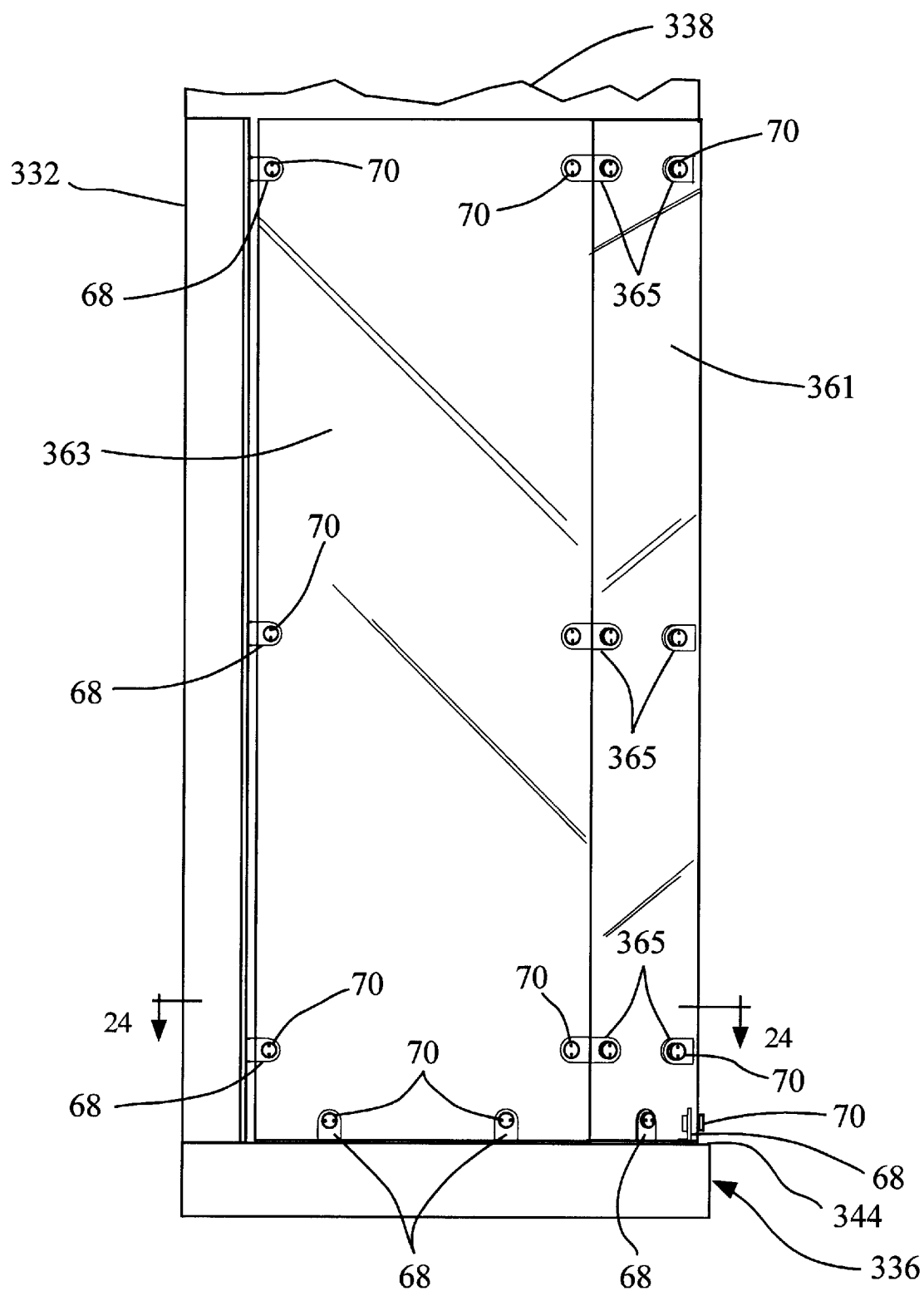
FIG. 19 is an enlarged side elevation of the bathing enclosure shown in FIG. 17.
Figures 22, 24:
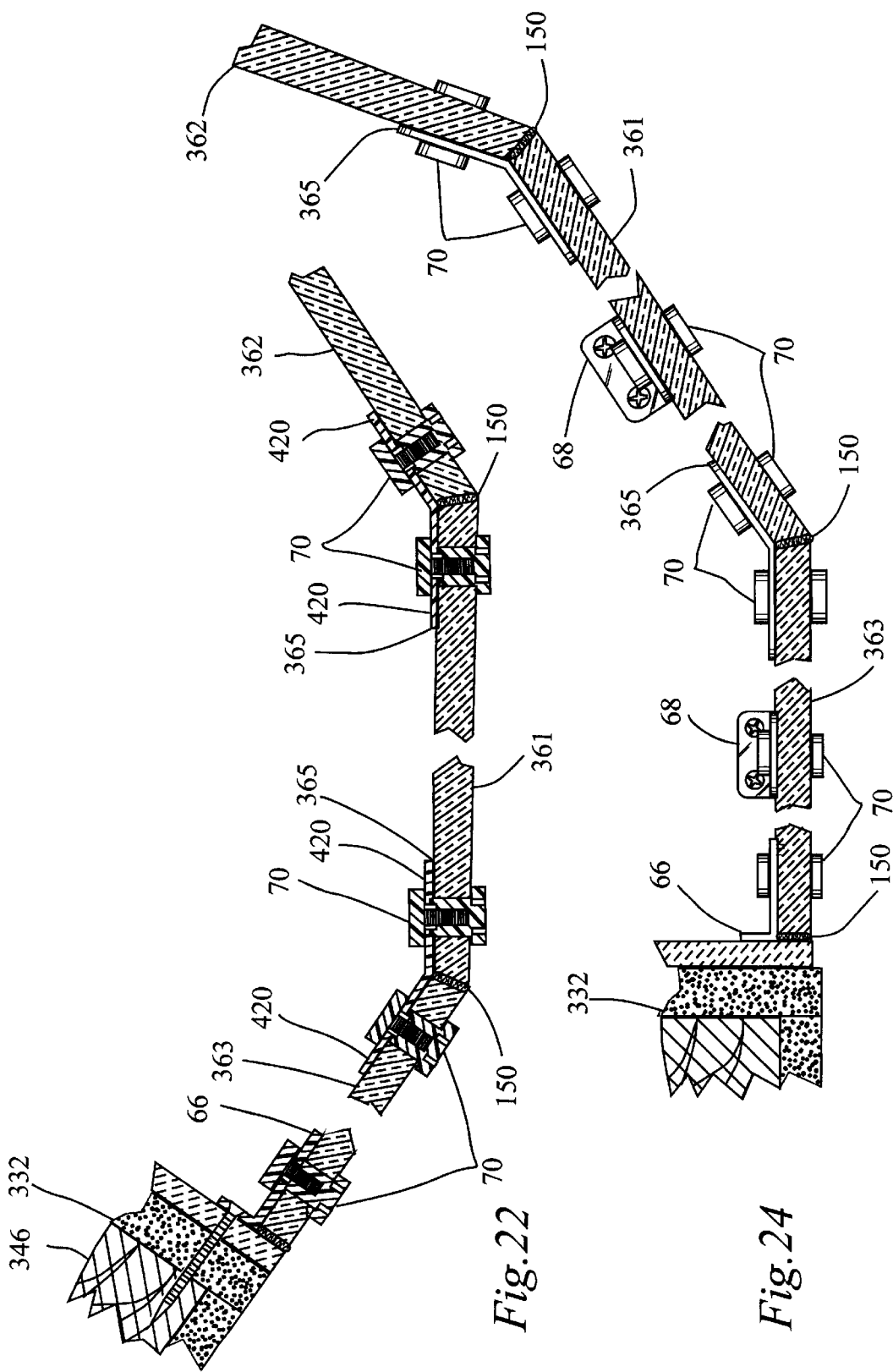
FIG. 22 is a fragmentary horizontal section taken on line 22—22 in FIG. 21.
FIG. 24 is a fragmentary horizontal section taken on line 24—24 in FIG. 19.
Figure 23:
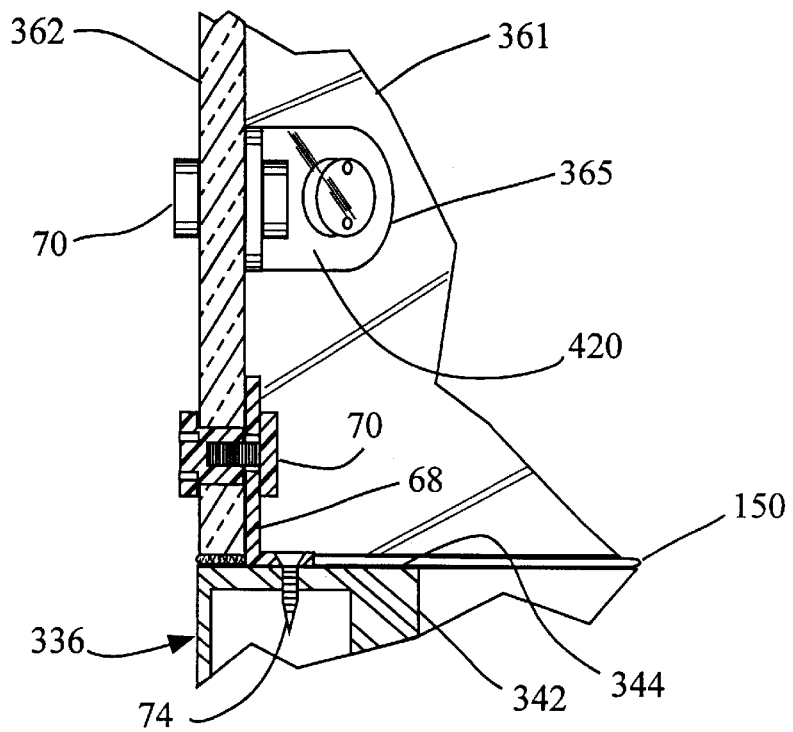
FIG. 23 is a fragmentary vertical section taken on line 23—23 in FIG. 21.
Figure 25:
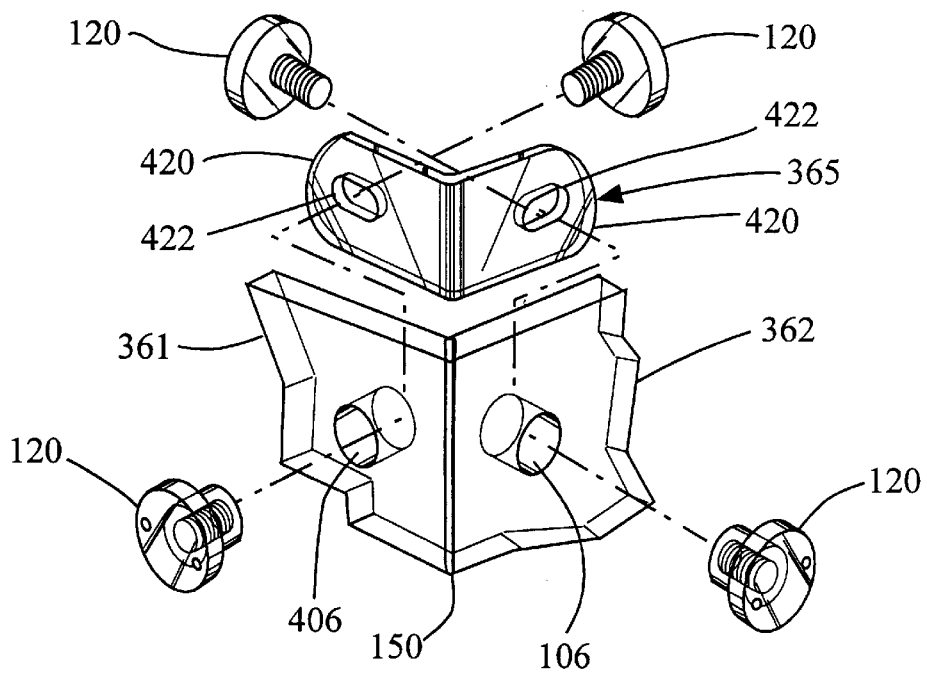
FIG. 25 is an exploded isometric view of two fragmentary glass panels in edge-to-edge obtuse angular relationship, with clear sealant in the joint like FIG. 15, and also showing a support bracket and fasteners used to connect the panels together.

The third embodiment of the present invention is generally indicated by the number 330 in FIGS. 17–19. This bathing enclosure includes a back wall 332, a floor 334, a pan 336, and a side wall 338. The pan includes a dam 342 having a horizontal support surface 344, the back wall has a vertical stud 346, and the side wall has a stud 347. The enclosure includes a showerhead 50, a valve 52 and a drain 54.

The principal difference between the third embodiment and first and second embodiments is in the panel assembly 360 (FIGS. 17–19). Here, there is a fixed front panel 362, similar to the front panel 62 in the first and second embodiments, a fixed side panel 363, similar to the side panel 263 in the second embodiment, and a fixed oblique panel 361 attached to the front and side panels. A door panel 364 is mounted on the side wall 338 by hinges 376, and a handle 378 is on the door panel. In this embodiment, therefore, the door is hung on the side wall instead of on the panel assembly and thus is not part of the panel assembly, as defined this third embodiment.

Each of the panels 361, 362, and 363 has the same characteristics as the panels 62 and 263 of the first and second embodiments, that is, they are of heavy glass with a thickness of between ³⁄₁₆" and ½₁", and the height may be the same as is typically used in such enclosures ranging from about five feet to about seven feet. In a preferred installation of the third embodiment, the front panel 362 may be from about twelve inches to about eighteen inches wide, the oblique panel may be from about twelve to fifteen inches wide and the side panel 363 may be from about eighteen to about twenty inches wide, thereby providing an overall enclosure dimension of about three by four and one-half feet.

The side panel 363 (FIGS. 17 and 19) is attached to the back wall 332 and the pan 336 by the side brackets 66 and bottom brackets 68 and their fasteners 70 in the same manner as described for the front panel 62 in both the first and second embodiments. However, the attachment of the oblique panel 361 to the side panel and the front panel 362 differs in the use of oblique spanning support brackets 365 similar to but different from the spanning brackets 265.

The spanning support brackets 365 (FIGS. 17–22 and 25) are of the same clear plastic as in the first and second embodiments and thus preferably polycarbonate. Each spanning bracket includes a pair of elongated panel flanges 420 projecting from a juncture in oblique angular relation to each other, preferably at an angle of one-hundred and thirty-five degrees. Preferably the length of each flange is about 2.250", the width is about 1.50", and the thickness is about 0.188", although, as before, the invention is not limited to these particular dimensions. Each panel flange has an elliptical slot 422 whose major axis extends lengthwise of its flange. Preferably, in the embodiment having the dimensions set forth above, each slot has a major axis of about 0.502" and a minor axis of about 0.328", with the center of each slot being about 1.5" from the juncture between the flanges.

The panel assembly 360 is preferably installed by initially installing the side panel 363 in the same manner as the side panel 263. Thereafter, the oblique panel 361 is installed in the position shown in FIG. 17 and is attached to the pan 336 by the bracket 268 and its fasteners 70 and to the side panel 363 by the spanning brackets 365 and their associated fasteners 70. Thereafter, the front panel 362 is located in the position shown in FIG. 17, attached at the bottom by the bottom brackets 68 and fasteners 70, and attached to the oblique panel by the spanning brackets 365 and the fasteners 70. As before, the slots 422 in the flanges 420 of the spanning brackets allow for some adjustment in the positions of these panels whereupon the fasteners are tightened. Also, as before, silicone 150 is applied to the joints between the lower edges of the panels 361, 362 and 363 and the pan, between the inner edge of the side panel 363 and the back wall 332, between the mating edges of the side panel and the oblique panel, and between the mating edges of the oblique panel and the front panel.

It will thus be understood that in all three embodiments of the present invention, an apparatus has been provided for supporting heavy glass panels in a bathing, i.e., shower, enclosure without using metal frames or metal clips to support the panels. The support brackets and fasteners enable heavy glass panels to be supported in the enclosure while minimizing the use of metal to support the panels and thus greatly increasing the transparency of the installation. The only metal used in the panel assemblies of the three embodiments shown and described is in the screws used to attach the side and pan brackets to the wall and the pan and in the hinges. The cooperative association among the support brackets, the fasteners, the supporting pan and wall, together with the use of silicone in the joints between the panels and between the panels and the wall and pan, provide dependable support for the heavy glass panels described. Furthermore, in bathing enclosures of the type shown and described in the first and second embodiments, the panel assemblies have sufficient structural stability to support a door panel hinged on the panel assembly.

Although preferred embodiments of the present invention have been shown and described, various modifications, substitutions and equivalents may be used therein without departing from the spirit and scope of the invention. Accordingly, it is to be understood that the present invention has been described by way of illustration and not limitation.

What is claimed is:

1. In a bathing enclosure,
a first supporting structure providing an upwardly facing flat horizontal supporting surface;
a second supporting structure providing a flat vertical supporting surface upstanding from the horizontal supporting surface;
an upstanding frameless bath enclosure panel of transparent glass borne by the horizontal supporting surface, the panel having a vertical edge in sealed relation to the vertical supporting surface and a horizontal edge in sealed relation to the horizontal supporting surface;
a plurality of support brackets of clear plastic each having angularly related first and second flanges projecting outwardly from a juncture between its respective flanges, a first of the support brackets being positioned between the panel and the horizontal supporting surface with its first and second flanges respectively lying flat against the panel and the horizontal supporting surface,
a second of the support brackets being positioned between the panel and the vertical supporting surface with its first and second flanges respectively lying flat against the panel and the vertical supporting surface;
interconnected first fastening members of clear plastic extending through and joining the first flanges and the panel; and
second fastening members connecting the second flanges to the horizontal supporting surface and the vertical supporting surface.

2. The enclosure of claim 1,
wherein each first fastening member includes interconnected shanks extending through at least one of the flanges and through the panel and having opposite ends, and heads connected to said ends wherein the flange and the panel are sandwiched between the beads.

3. The enclosure of claim 1,
wherein each first fastening member includes male and female connectors having threadably interconnected shanks extending through at least one of the flanges and through the panel and having opposite ends, and heads connected to said ends wherein the flange and the panel are sandwiched between the heads.

4. The apparatus of claim 3, wherein the panels are glass,
wherein the length of the shanks on each female connector is approximately equal to the thickness of the glass panels; and
wherein the spacing between the end of the shank on each female connector and the head of the associated male connector is approximately equal to the thickness of its respective flange.

5. The enclosure of claim 1,
wherein the vertical and horizontal edges of the panel are respectively sealingly joined to the vertical and horizontal supporting surfaces by clear silicone.

6. The enclosure of claim 1,
wherein there are a plurality of the first brackets spaced along the horizontal supporting surface; and
wherein there is a plurality of the second brackets spaced along the vertical supporting surface.

7. The enclosure of claim 1,
wherein there is a door hingedly supported from the panel.

8. The enclosure of claim 1,
wherein the panel has a maximum width of about eighteen inches.

9. The enclosure of claim 1,
wherein the panel is at least about ⅜" thick;
wherein the panel has a maximum width of about eighteen inches;
wherein there is a door hingedly supported from the panel;
wherein the vertical and horizontal edges of the panel are respectively sealingly joined to the vertical and horizontal supporting surfaces by clear silicone;
wherein there are a plurality of the first brackets spaced along the horizontal supporting surface; and
wherein there are a plurality of the second brackets spaced along the vertical supporting surface.

10. A shower enclosure surrounding a bathing area having a floor and walls, comprising:
a first supporting structure at the floor of the enclosure and providing an upwardly facing flat horizontal supporting surface;
a second supporting structure projecting from one of the walls of the enclosure providing a flat vertical supporting surface upstanding from the horizontal supporting surface;
upstanding first and second frameless bath enclosure panels of transparent glass borne by the horizontal supporting surface, each panel having opposite inside and outside vertical edges and a horizontal lower edge, the panels being disposed in angular relation to each other with their inside edges in edge-to-edge sealing engagement, with their horizontal edges sealingly joined to the horizontal supporting surface, and with the outside edge of the first panel being sealingly joined to the vertical supporting surface;
a plurality of support brackets of transparent plastic each having angularly related first and second flanges projecting outwardly from a juncture between its respective flanges, the brackets including lower, lateral and intermediate brackets,
at least two lower brackets being individually positioned between the first and second panels and the horizontal supporting surface with their first flanges lying flat against their respective panels and their second flanges lying flat against the horizontal supporting surface, at least one lateral bracket being positioned between the first panel and the vertical supporting surface with its first and second flanges respectively lying flat against the first panel and the vertical supporting surface,
at least one intermediate bracket spanning the inside edges of the panels with its flanges lying flat against the panels;
threadably interconnected first fastening members of transparent plastic extending through and joining the first flanges of the lower brackets and their respective panels;
threadably interconnected second fastening members of transparent plastic extending through and joining the first and second flanges of the intermediate brackets and their respective panels; and
third fastening members of transparent plastic extending through the second flanges of the lower and lateral flanges and threaded into the horizontal supporting surface and the vertical supporting surface.

11. A shower enclosure surrounding a bathing area having a floor and walls, comprising:
a first supporting structure at the floor of the enclosure and providing an upwardly facing flat horizontal supporting surface;
a second supporting structure projecting from one of the walls of the enclosure providing a flat vertical supporting surface upstanding from the horizontal supporting surface;
upstanding first, second, and third frameless bath enclosure panels of transparent glass borne by the horizontal supporting surface, each panel having opposite inside and outside vertical edges and a horizontal lower edge, the panels being disposed in angular relation to each other with the inside edges of the second panel being in edge-to-edge sealing engagement with the inside edges of the first and third panels respectively, with their horizontal edges sealingly joined to the horizontal supporting surface, and with the outside edge of the first panel being sealingly joined to the vertical supporting surface;
a plurality of support brackets of transparent plastic each having angularly related first and second flanges projecting outwardly from a juncture between its respective flanges, the brackets including lower, lateral and intermediate brackets,
at least three lower brackets being individually positioned between the first, second, and third panels and the horizontal supporting surface with their first flanges lying flat against their respective panels and their second flanges lying flat against the horizontal supporting surface, at least one lateral bracket being positioned between the first panel and the vertical supporting surface with its first and second flanges respectively lying flat against the first panel and the vertical supporting surface,
intermediate brackets individually spanning the inside edges of the first and second panels and the inside edges of the second and third panels with their flanges lying flat against their respective panels;
threadably interconnected first fastening members of transparent plastic extending through and joining the first flanges of the lower brackets and their respective panels; threadably interconnected second fastening members of transparent plastic extending through and joining the first and second flanges of the intermediate brackets and their respective panels; and
third fastening members of transparent plastic extending through the second flanges of the lower and lateral flanges and threaded into the horizontal supporting surface and the vertical supporting surface.

* * * * *